(12) United States Patent
Jiang (10) Patent No.: US 10,853,421 B2
(45) Date of Patent: Dec. 1, 2020

(54) SEGMENTED SENTENCE RECOGNITION METHOD AND DEVICE FOR HUMAN-MACHINE INTELLIGENT QUESTION ANSWER SYSTEM

(71) Applicants:Beijing Jingdong Shangke Information Technology Co., Ltd., Beijing (CN); Beijing Jingdong Century Trading Co., Ltd., Beijing (CN)

(72) Inventor: Wen Jiang, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 224 days.

(21) Appl. No.: 16/096,678

(22) PCT Filed: Apr. 20, 2017

(86) PCT No.: PCT/CN2017/081201
§ 371 (c)(1),
(2) Date: Oct. 25, 2018

(87) PCT Pub. No.: WO2017/186050
PCT Pub. Date: Nov. 2, 2017

(65) Prior Publication Data
US 2020/0327168 A1 Oct. 15, 2020

(30) Foreign Application Priority Data

Apr. 25, 2016 (CN) .......................... 2016 1 0262499

(51) Int. Cl.
*G10L 15/22* (2006.01)
*G10L 15/00* (2013.01)
*G06F 16/9032* (2019.01)
*G06F 40/53* (2020.01)
(Continued)

(52) U.S. Cl.
CPC ...... *G06F 16/90332* (2019.01); *G06F 40/289* (2020.01); *G06F 40/53* (2020.01); *G06N 3/049* (2013.01)

(58) Field of Classification Search
CPC ................................ G10L 15/00; G10L 15/22
See application file for complete search history.

(56) References Cited

U.S. PATENT DOCUMENTS 9,082,404 B2 7/2015 Harada
9,135,912 B1 * 9/2015 Strope ................... G10L 15/187
(Continued)

FOREIGN PATENT DOCUMENTS

CN 102880611 A 1/2013
CN 102890723 A 1/2013
(Continued)

OTHER PUBLICATIONS

Wang Long et al.; "Parallel Optimization of Chinese Language Model Based on Recurrent Neural Network"; Journal of Applied Sciences—Electronic and Information Engineering, vol. 33, No. 3; May 2015; with English abstract (9 pages).
(Continued)

*Primary Examiner* — Shreyans A Patel
(74) *Attorney, Agent, or Firm* — Nixon Peabody LLP (57) ABSTRACT

Disclosed are a segmented sentence recognition method and device for a human-machine intelligent question-answer system. One particular embodiment of the method includes: receiving a current sentence input by a user; inputting the current sentence into a pre-trained segmented sentence recognition model to obtain a first probability of the current sentence being a complete sentence, wherein the segmented sentence recognition model is used for determining the first probability according to a probability corresponding to a Chinese language model of the current sentence and a
(Continued)

probability corresponding to a recurrent neural network language model; and if the first probability is greater than a pre-set first threshold value, determining the current sentence to be a complete sentence. In the embodiment, a Chinese language model and a recurrent neural network language model are merged to obtain a segmented sentence recognition model for determining a probability of a current sentence being a complete sentence.

11 Claims, 6 Drawing Sheets

(51) Int. Cl.
*G06F 40/289* (2020.01)
*G06N 3/04* (2006.01)

(56) References Cited

U.S. PATENT DOCUMENTS

| | | |
|---|---|---|
| 9,176,941 B2 | 11/2015 | Xiao |
| 9,311,932 B2 | 4/2016 | Carter |
| 9,471,566 B1* | 10/2016 | Zhang .................. G06F 40/129 |
| 2004/0111262 A1* | 6/2004 | Maison .................. G10L 15/18 704/251 |
| 2009/0112573 A1* | 4/2009 | He ......................... G06F 40/45 704/4 |
| 2010/0114944 A1 | 5/2010 | Adler et al. |
| 2013/0096918 A1 | 4/2013 | Harada |
| 2014/0136970 A1 | 5/2014 | Xiao |
| 2015/0206544 A1 | 7/2015 | Carter |
| 2015/0206644 A1 | 7/2015 | Gerovac |

FOREIGN PATENT DOCUMENTS

| | | |
|---|---|---|
| CN | 103050115 A | 4/2013 |
| UA | 67700 C2 | 6/2004 |

OTHER PUBLICATIONS

International Search Report and Written Opinion dated Jul. 27, 2017 which issued on International Patent Application No. PCT/CN2017/081201 (7 pages).

* cited by examiner

SEGMENTED SENTENCE RECOGNITION METHOD AND DEVICE FOR HUMAN-MACHINE INTELLIGENT QUESTION ANSWER SYSTEM

CROSS-REFERENCE TO RELATED APPLICATIONS

The present disclosure is a U.S. National Stage Application of International Application No. PCT/CN2017/081201, with an international filing date of Apr. 20, 2017, which claims priority to Chinese Patent Application No. 201610262499.2, filed on Apr. 25, 2016, the contents of which are incorporated herein by reference in their entirety.

TECHNICAL FIELD

The present disclosure relates to the technical field of computers, specifically to the technical field of Internet, and more particularly to a segmented sentence recognition method and apparatus for a human-machine intelligent question-answer system.

BACKGROUND

With the development of the human-machine intelligent technology, more and more question-answer systems adopt the human-machine intelligence technology. The existing human-machine intelligent question-answer system usually adopts a "one question and one answer" form, that is, the user input is defaulted as a complete sentence, and then the answer to the question is fed back to the complete sentence. In fact, in a process of human-machine dialogue, a user may separate a complete sentence into a plurality of segmented sentences for expression. For example, the user may separate "I want to ask how long it will take for things to be delivered to Beijing" into two segmented sentences "I want to ask" and "how long it will take things to be delivered to Beijing" for input. For this situation, it requires the human-machine intelligent question-answer system to accurately judge the integrity of a sentence input by a user.

The existing human-machine intelligent question-answer system usually uses a Chinese language model (N-gram model) to judge the probability of an input sentence being a complete sentence by predicting the probability of the next word appearing. However, due to the limitations of the N-gram model itself, the value of N is usually only 2 or 3, i.e., the appearance of the current word is only related to the previous one or two words, resulting in that the model is unable to accurately judge whether the input sentence is a complete sentence due to lack of information.

SUMMARY

The object of the present disclosure is to provide an improved segmented sentence recognition method and apparatus for a human-machine intelligent question-answer system, to solve the technical problems mentioned in the above background section.

In a first aspect, the present disclosure provides a segmented sentence recognition method for a man-computer intelligent question-answer system, and the method includes: receiving a current sentence input by a user; inputting the current sentence into a pre-trained segmented sentence recognition model to obtain a first probability of the current sentence being a complete sentence, wherein the segmented sentence recognition model is used for determining the first probability according to the probability corresponding to a Chinese language model of the current sentence and the probability corresponding to a recurrent neural network language model; and determining the current sentence to be a complete sentence if the first probability is greater than a pre-set first threshold.

In some embodiments, the method further includes: determining, on the basis of the recurrent neural network language model, a second probability of a first word of the current sentence appearing in a previous sentence adjacent to the current sentence; determining the current sentence and the previous sentence adjacent to the current sentence to be segmented sentences if the second probability is greater than a pre-set second threshold; and combining the current sentence with the previous sentence as a complete sentence.

In some embodiments, the method further includes establishing a segmented sentence recognition model, which includes: acquiring a question corpus, wherein the question corpus includes a plurality of question language materials, and the question language materials are complete sentences; segmenting the question language materials to generate a plurality of segmented sentences; determining a score of a segmented sentence according to a number of words contained in the segmented sentence and a number of words contained in a complete sentence corresponding to the segmented sentence, wherein the score is used for representing the probability of the segmented sentence corresponding to the score being a complete sentence; determining the probability corresponding to the Chinese language model of the segmented sentence and the probability corresponding to the recurrent neural network language model; and training to obtain the segmented sentence recognition model by taking the probabilities of each of the segmented sentences and the scores of the segmented sentences as training samples.

In some embodiments, the segmenting the question language materials to generate a plurality of segmented sentences includes generating the segmented sentences, including: segmenting a first question language material to obtain the first question language material composed of n words, wherein the first question language material is a question language material in the question corpus, and n is a natural number; taking the $1^{st}$ to the $i^{th}$ words from the first question language material to generate an $i^{th}$ sentence, wherein $1 \leq i \leq n$; generating n segmented sentences corresponding to the first question language material; and on the basis of the generating the segmented sentences, generating segmented sentences corresponding to the first question language materials in the question corpus.

In some embodiments, the method further includes: determining the current sentence to be a segmented sentence if the first probability is less than or equal to a pre-set first threshold; and generating prompt information for prompting the user to continue inputting.

In a second aspect, the present disclosure provides a segmented sentence recognition apparatus for a man-computer intelligent question-answer system, and the apparatus includes: a current sentence receiving module, configured for receiving a current sentence input by a user; a first probability obtaining module, configured for inputting the current sentence into a pre-trained segmented sentence recognition model to obtain a first probability of the current sentence being a complete sentence, wherein the segmented sentence recognition model is used for determining the first probability according to the probability corresponding to a Chinese language model of the current sentence and the probability corresponding to a recurrent neural network language model; and a complete sentence determining module, configured for determining the current sentence to be a complete sentence if the first probability is greater than a pre-set first threshold.

In some embodiments, the apparatus further includes: a second probability determining module, configured for determining, on the basis of the recurrent neural network language model, a second probability of a first word of the current sentence appearing in a previous sentence adjacent to the current sentence, determining the current sentence and the previous sentence adjacent to the current sentence to be segmented sentences if the second probability is greater than a pre-set second threshold, and combining the current sentence with the previous sentence as a complete sentence.

In some embodiments, the apparatus further includes: a segmented sentence recognition model establishing module, configured for establishing the segmented sentence recognition model, and including: a question corpus acquiring unit, configured for acquiring a question corpus, wherein the question corpus includes a plurality of question language materials, and the question language materials are complete sentences; a segmented sentence generating unit, configured for segmenting the question language materials to generate a plurality of segmented sentences; a score determining unit, configured for determining a score of a segmented sentence according to a number of words contained in the segmented sentence and a number of words contained in a complete sentence corresponding to the segmented sentence, wherein the score is used for representing the probability of the segmented sentence corresponding to the score being a complete sentence; a probability determining unit, configured for determining the probability corresponding to the Chinese language model of the segmented sentence and the probability corresponding to the recurrent neural network language model; and a segmented sentence recognition model training unit, configured for training to obtain the segmented sentence recognition model by taking the probabilities of each of the segmented sentence and the scores of the segmented sentence as training samples.

In some embodiments, the segmented sentence generating unit is specifically configured for generating the segmented sentences, and generating the segmented sentences includes: segmenting a first question language material to obtain the first question language material composed of n words, wherein the first question language material is a question language material in the question corpus, and n is a natural number; taking the 1st to the $i^{th}$ words from the first question language material to generate an $i^{th}$ sentence, wherein $1 \leq i \leq n$; generating n segmented sentences corresponding to the first question language material; and on the basis of the step of generating the segmented sentences, generating segmented sentences corresponding to the first question language materials in the question corpus.

In some embodiments, the apparatus further includes: a segmented sentence determining module, configured for determining the current sentence to be a segmented sentence if the first probability is less than or equal to a pre-set first threshold; and generating prompt information for prompting the user to continue inputting.

According to the segmented sentence recognition method and apparatus for the human-machine intelligent question-answer system, provided by the present disclosure, first, the current sentence input by a user is received, then the received current sentence is input into a pre-trained segmented sentence recognition model to obtain a first probability of the current sentence being a complete sentence, then whether the first probability is greater than a preset first threshold is determined, and if the first probability is greater than the preset first threshold, the current sentence is determined as a complete sentence. The method merges a Chinese language model and a recurrent neural network language model to obtain a segmented sentence recognition model for determining the probability of the current sentence being a complete sentence, and the segmented sentence recognition model can improve accuracy of the human-machine intelligent question-answer system to judge that the current sentence is a complete sentence.

BRIEF DESCRIPTION OF THE DRAWINGS

Other features, objectives and advantages of the present disclosure will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
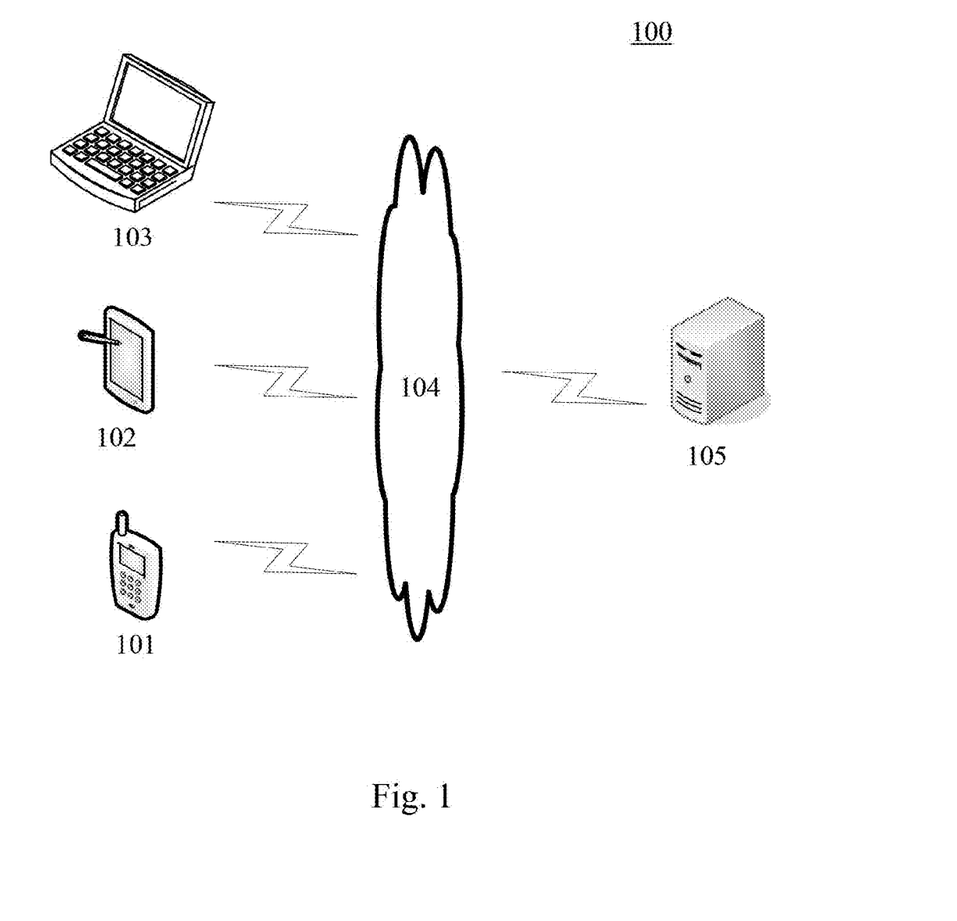
FIG. 1 is an illustrative system architecture diagram to which the present disclosure can be applied.

FIG. 1 shows an exemplary architecture of a system 100 in which a segmented sentence recognition method for a human-machine intelligent system or segmented sentence recognition apparatus for a human-machine intelligent system according to the embodiments of the present disclosure is applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as instant messaging softwares, shopping applications, search applications, webpage browser applications, and social platform software may be installed on the terminal devices 101, 102 and 103.

The terminal devices 101, 102 and 103 may be various electronic devices including a display screen and supporting human-machine intelligent questioning and answering, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a back-end server for proving support for the current sentence transmitted by the terminal devices 101, 102 and 103. The back-end server may perform processing such as statistics or analysis on the data such as the received current sentence, and return a processing result to the terminal devices.

It should be noted that the segmented sentence recognition method for the human-machine intelligent question-answer system is generally executed by the server 105. Accordingly, an object data updating apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
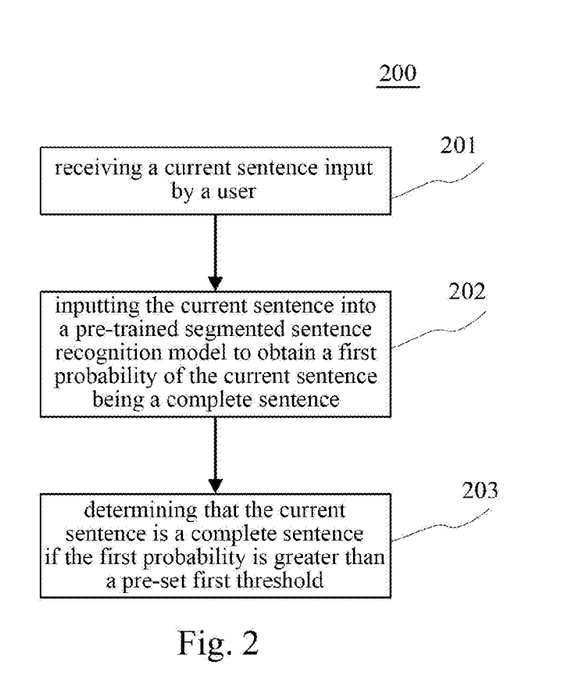
FIG. 2 is a flow chart of an embodiment of the segmented sentence recognition method for the human-machine intelligent question-answer system according to the present disclosure.

Continue to refer to FIG. 2, it shows a flow 200 of an embodiment of the segmented sentence recognition method for the human-machine intelligent question-answer system according to the present disclosure. The segmented sentence recognition method for the human-machine intelligent question-answer system includes:

Step 201, receiving a current sentence input by a user.

In the present embodiment, an electronic device (e.g., a server shown in FIG. 1) on which a human-machine intelligent question-answer method runs can receive the current sentence input by the user in a wired connection mode or a wireless connection mode from a terminal which is used by the user to carry out human-machine intelligent question-answer. It should be noted that the above wireless connection mode may include, but is not limited to, 3G/4G connection, WiFi connection, Bluetooth connection, WiMAX connection, Zigbee connection, UWB (Ultra-wide band) connection, and other currently known or future developed wireless connection modes.

Generally, in the human-machine intelligent question-answer system, a current sentence is considered to have been input by a user after one input is completed by the user, regardless of whether the sentence is a complete sentence. For example, when the user wants to ask how long it will take for things to be delivered to Beijing, whether the user input is a segmented sentence similar to "I want to ask" or a complete sentence similar to "I want to ask how long it will take for things to be delivered to Beijing", the user input can be considered as the current sentence.

Step 202, inputting the current sentence into a pre-trained segmented sentence recognition model to obtain a first probability of the current sentence being a complete sentence.

In the present embodiment, an electronic device on which the segmented sentence recognition method for the human-machine intelligent question-answer system runs can train a segmented sentence recognition model in advance, and the segmented sentence recognition model can be used to determine the first probability of the current sentence being a complete sentence according to the probability corresponding to a Chinese language model of the current sentence input by the user and the probability corresponding to the recurrent neural network language model. On the basis of the current sentence input by the user received in step 201, the electronic device may input the current sentence into the segmented sentence recognition model to obtain the first probability of the current sentence being a complete sentence.

Step 203, determining the current sentence to be a complete sentence if the first probability is greater than a pre-set first threshold.

In the present embodiment, the electronic device on which the segmented sentence recognition method for the human-machine intelligent question-answer system runs may pre-set a first threshold, and then on the basis of the first probability of the current sentence being a complete sentence obtained in step 202, the electronic device may judge a relationship between the first probability and the first threshold, and if the first probability is greater than the pre-set first threshold, the current sentence may be considered as a complete sentence.

In some optional implementations of the present embodiment, if the first probability is less than or equal to the pre-set first threshold, the current sentence may be considered as a segmented sentence. The electronic device can generate prompt information for prompting the user to continue inputting, which can be similar to "well, say it please" or the like.

According to the segmented sentence recognition method for the human-machine intelligent question-answer system, provided by the above embodiment of the present disclosure, first, the current sentence input by a user is received, then the received current sentence is input into a pre-trained segmented sentence recognition model to obtain a first probability of the current sentence being a complete sentence, then whether the first probability is greater than a pre-set first threshold is determined, and if the first probability is greater than the pre-set first threshold, the current sentence is determined as a complete sentence. The method merges a Chinese language model and a recurrent neural network language model to obtain a segmented sentence recognition model for determining the probability of the current sentence being a complete sentence. The segmented sentence recognition model can improve the accuracy of the human-machine intelligent question-answer system to judge that the current sentence is a complete sentence.

Figure 3:
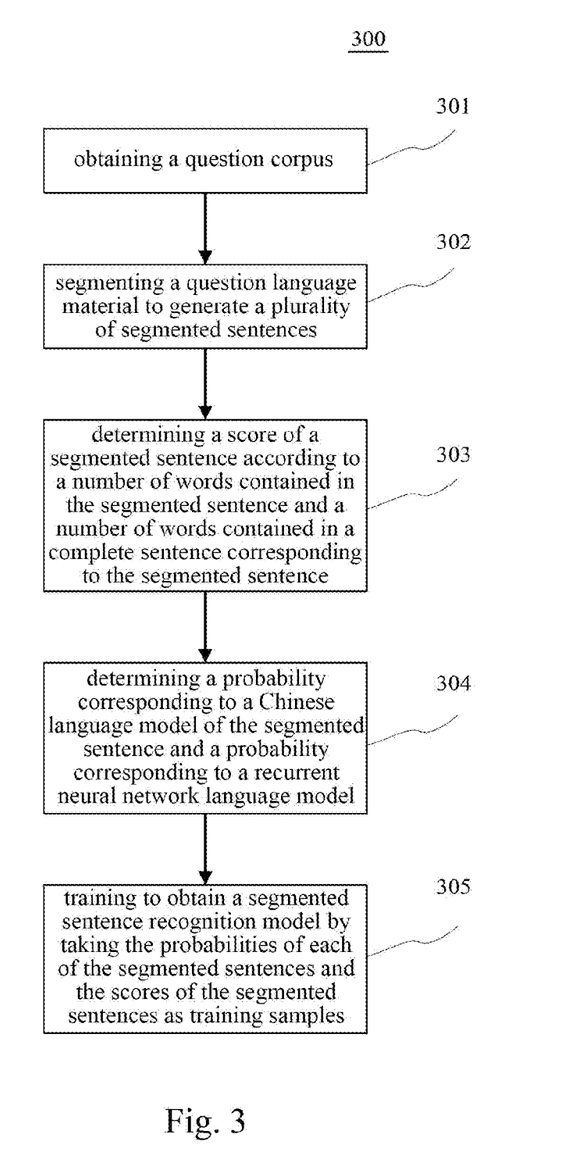
FIG. 3 is a schematic flow chart of an implementation of obtaining a pre-trained segmented sentence recognition model in the segmented sentence recognition method for the human-machine intelligent question-answer system according to the present disclosure.

In some optional schemes, the pre-trained segmented sentence recognition model used in step 202 may be established through the flow 300 shown in FIG. 3.

Step 301, acquiring a question corpus.

In this implementation, the electronic device on which the segmented sentence recognition method for the human-machine intelligent question-answer system runs can select complete question language materials from historical human-machine question-answer data to form a question corpus. The question corpus here may include a plurality of question language materials, and each of the question language materials is a complete sentence. Taking consultation data of a human-machine intelligent question-answer system in the field of e-commerce as an example, the data include online consultation data and offline consultation data, and the offline consultation data are usually relatively complete sentences because they are not real-time interactive data, so the offline consultation data in the human-machine intelligent question-answer system can be selected to form the above question corpus.

It should be noted that the electronic device also needs to further process the obtained question corpus. First, the question language materials containing a plurality of complete sentences can be sentence-segmented. Here, commas, pauses, etc. in the question language materials can be deleted, and the question marks, periods, exclamation marks, etc. can be used as separators to segment the question language materials. Second, an end mark such as <end> can be added at the tail of each complete sentence.

Step 302, segmenting the question language material to generate a plurality of segmented sentences.

In the present embodiment, the electronic device can segment each of the question language materials in the question corpus by various means. After that, according to the word segmentation, the segmented sentences corresponding to each of the question language materials are generated. Taking the question language material "does this mobile phone have a metal body" as an example, word segmentation can be carried out first to obtain a word segmentation result as "does this mobile phone have a metal body", and then obtain segmented sentences corresponding to the question language material.

It should be noted that the electronic device can obtain segmented sentences corresponding to each of the question language materials through the following steps: first, the electronic device can perform word segmentation on the first question language material to obtain a first question corpus composed of n words, the first question language material here can be any question language material in the question corpus, and n is a natural number; after that, the electronic device can take the $1^{st}$ to the $i^{th}$ words from the first question language material to generate an $i^{th}$ segmented sentence; and finally, according to the above method, n segmented sentences corresponding to the first question language material are generated, wherein $1 \leq i \leq n$. The electronic device can use the method to generate segmented sentences corresponding to each of the question language materials in the question corpus. For example, if the first question language material is "does this mobile phone have a metal body", first, the first question language material can be subjected to word segmentation to obtain a word segmentation result as "does this mobile phone have a metal body". It can be seen that the first question language material includes six words and then six segmented sentences corresponding to the first question language material can be obtained. The six segmented sentences of the first question language material respectively are: "this", "this mobile phone", "this mobile phone have", "this mobile phone have a metal", "this mobile phone have a metal body", "does this mobile phone have a metal body", and "does this mobile phone have a metal body" therein can be considered as one kind of segmented sentence.

Step 303, determining a score of a segmented sentence according to a number of words contained in a segmented sentence and a number of words contained in a complete sentence corresponding to the segmented sentence.

In this implementation, on the basis of the first question language material and the segmented sentences corresponding to the first question language material obtained in step 302, the electronic device can determine the number of words contained in a segmented sentence and a complete sentence corresponding to the segmented sentence, and divide the number of words contained in each of segmented sentences by the number of words contained in the complete sentence corresponding to the segmented sentence to obtain a score, namely the probability of the segmented sentence being a complete sentence. Taking the first question language material "does this mobile phone have a metal body" and its corresponding segmented sentences including "this mobile phone have" and "does this mobile phone have a metal body" as examples, the number of words contained in the first question language material is 6, and the numbers of words contained in the corresponding above segmented sentences are 3 and 6. Thus, the scores used to characterize the probabilities of the two segmented sentences being complete sentences are 0.5 and 1.

Step 304, determining a probability corresponding to a Chinese language model of the segmented sentence and a probability corresponding to the recurrent neural network language model.

In this implementation, the electronic device determines the probability of a segmented sentences being a complete sentence respectively by using the Chinese language model and the recurrent neural network language model. Compared with a method for determining the probability of a complete sentence only by the Chinese language model in the prior art, the mode here can effectively avoid the problem that the model accuracy is low due to data sparsity.

Step 305, training to obtain the segmented sentence recognition model by taking the probabilities of each of the segmented sentences and the scores of the segmented sentences as training samples.

In this implementation, on the basis of the scores of the segmented sentence determined in step 303, and the probability corresponding to the Chinese language model of each of the segmented sentences and the probability corresponding to the recurrent neural network language model determined in step 304, the electronic device may carry out the training by use of a linear regression algorithm and the like to generate the above segmented sentence recognition model. The segmented sentence recognition model here can be a formula like $y=f(x_1,x_2)$, wherein $x_1$ and $x_2$ refer to the probability corresponding to the Chinese language model of any sentence and the probability corresponding to the recurrent neural network language model respectively, and Y refers to the probability of the sentence being a complete sentence.

According to the training method of the segmented sentence recognition model provided by the implementation of the above embodiment of the present disclosure, each of the question language materials in the question corpus is segmented to obtain segmented sentences corresponding to each of the question language materials, then the scores of each of the segmented sentences, the probability corresponding to the Chinese language model and the probability corresponding to the recurrent neural network language model are obtained as training data, and finally the segmented sentence recognition model is obtained by training the training data by adopting a linear regression algorithm and the like, wherein the segmented sentence recognition model merges the advantages of the Chinese language model and the recurrent neural network language model, so that the accuracy of the man-computer intelligent question-answer system to judge whether the current sentence is a complete sentence can be effectively improved.

Figure 4:
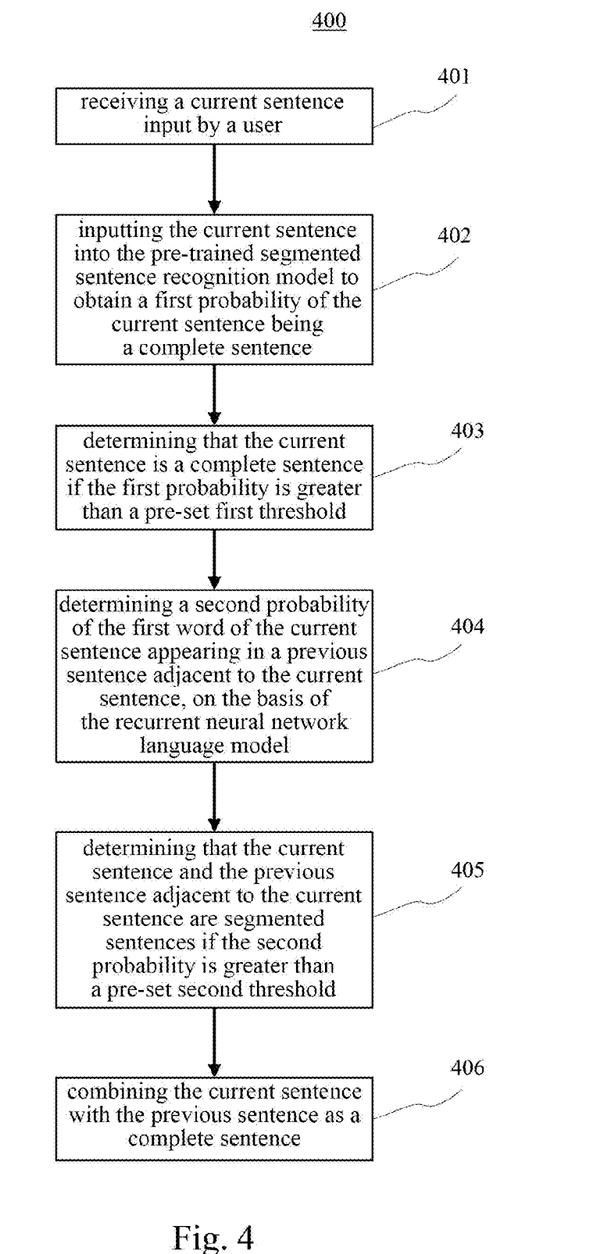
FIG. 4 is a flow chart of another embodiment of the segmented sentence recognition method for the human-machine intelligent question-answer system according to the present disclosure.

Further refer to FIG. 4, it shows a flow 400 of another embodiment of the segmented sentence recognition method for the human-machine intelligent question-answer system.

The flow 400 of the segmented sentence recognition method for the human-machine intelligent question-answer system includes:

Step 401, receiving a current sentence input by a user.

In the present embodiment, an electronic device (e.g., a server shown in FIG. 1) on which a human-machine intelligent question-answer method runs can receive the current sentence input by the user in a wired connection mode or a wireless connection mode from a terminal which is used by the user to carry out human-machine intelligent question-answer.

Step 402, inputting the current sentence into a pre-trained segmented sentence recognition model to obtain a first probability of the current sentence being a complete sentence.

In the present embodiment, the electronic device on which the segmented sentence recognition method for the human-machine intelligent question-answer system runs can input the current sentence input by the user into the trained segmented sentence recognition model to obtain the first probability of the current sentence being a complete sentence. The segmented sentence recognition model here can be used to determine the first probability of the current sentence being a complete sentence according to the probability corresponding to the Chinese language model of the current sentence input by the user and the probability corresponding to the recurrent neural network language model.

Step 403, determining the current sentence to be a complete sentence if the first probability is greater than a pre-set first threshold.

In the present embodiment, the electronic device on which the segmented sentence recognition method for the human-machine intelligent question-answer system runs may set a first threshold in advance, and then on the basis of the first probability of the current sentence being a complete sentence obtained in step 402, the electronic device may judge a relationship between the first probability and the first threshold, and if the first probability is greater than the pre-set first threshold, the current sentence may be considered as a complete sentence.

Step 404, determining a second probability of the first word of the current sentence appearing in a previous sentence adjacent to the current sentence on the basis of the recurrent neural network language model.

In the present embodiment, on the basis of that the current sentence is determined as a complete sentence in step 403, the electronic device can first obtain the previous sentence adjacent to the current sentence and the first word in the current sentence, and then predict the second probability of the first word of the current sentence appearing in the previous sentence adjacent to the current sentence by using the recurrent neural network language model.

Step 405, determining the current sentence and the previous sentence adjacent to the current sentence are segmented sentences if the second probability is greater than a pre-set second threshold.

In the present embodiment, the electronic device may pre-set the second threshold and then compare the second probability with the second threshold. The current sentence and the previous sentence adjacent to the current sentence can be considered as segmented sentences if the result of the comparison is that the second probability is greater than the second threshold. The previous sentence adjacent to the current sentence can be considered as a complete sentence if the result of the comparison is that the second probability is less than or equal to the second threshold.

Step 406, combining the current sentence with the previous sentence as a complete sentence.

In the present embodiment, on the basis of that the current sentence and the previous sentence adjacent to the current sentence are determined as segmented sentences in step 405, the electronic device can combine the current sentence with the previous sentence adjacent to the current sentence as a complete sentence. Therefore, the steps 404, 405 and 406 can be considered as further judgment on whether the current sentence is a complete sentence, and the accuracy of judging whether the current sentence is a complete sentence can be further improved. Moreover, this embodiment realizes a form of "multiple questions and one answer" of the human-machine intelligent question-answer system, that is, when the user inputs more than one segmented sentences, the human-machine intelligent question-answer system can carry out feedback answering once.

As can be seen from FIG. 4, compared with the embodiment corresponding to FIG. 2, the flow 400 of the segmented sentence recognition method for the human-machine intelligent question-answer system in the present embodiment highlights the step of further judging whether the current sentence is a complete sentence. Therefore, According to the scheme described in the present embodiment, whether the current sentence is a complete sentence can be judged again through the recurrent neural network language model, thereby further improving the accuracy of judging whether the current sentence is a complete sentence.

Figure 5:
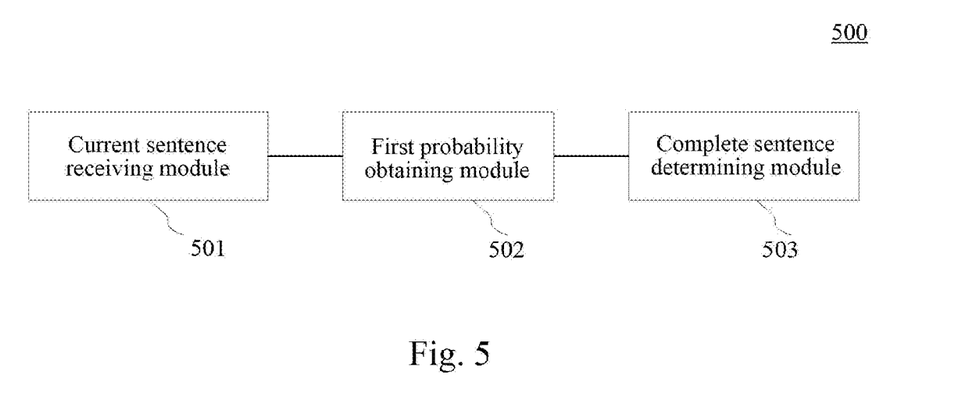
FIG. 5 is a structure diagram of an embodiment of the segmented sentence recognition apparatus for the human-machine intelligent question-answer system according to the present disclosure.

Further refer to FIG. 5, as the implementation of the method shown in the above figures, the present disclosure provides an embodiment of a segmented sentence recognition apparatus for a human-machine intelligent question-answer system, the embodiment of the apparatus corresponds to the embodiment of the method shown in FIG. 2, and the apparatus can be specifically applied to various types of electronic devices.

As shown in FIG. 5, the human-machine intelligent question-answer apparatus 500 as described in the present embodiment includes a current sentence receiving module 501, a first probability obtaining module 502, and a complete sentence determining module 503. The current sentence receiving module 501 is configured for receiving a current sentence input by a user; the first probability obtaining module 502 is configured for inputting the current sentence into a pre-trained segmented sentence recognition model to obtain a first probability of the current sentence being a complete sentence, wherein the segmented sentence recognition model is used for determining the first probability according to the probability corresponding to a Chinese language model of the current sentence and the probability corresponding to a recurrent neural network language model; and the complete sentence determining module 503 is configured for determining the current sentence to be a complete sentence if the first probability is greater than a preset first threshold.

In some optional implementations of the present embodiment, the apparatus 500 further includes a second probability determining module (not shown) which is configured for determining, on the basis of the recurrent neural network language model, a second probability of a first word of the current sentence appearing in a previous sentence adjacent to the current sentence, determining the current sentence and the previous sentence adjacent to the current sentence to be segmented sentences if the second probability is greater than a pre-set second threshold, and combining the current sentence with the previous sentence as a complete sentence.

In some optional implementations of the present embodiment, the apparatus 500 further includes a segmented sentence recognition model establishing module (not shown) which is configured for establishing the segmented sentence recognition model, and includes: a question corpus acquiring unit (not shown), configured for acquiring a question corpus, wherein the question corpus includes a plurality of question language materials, and the question language materials are complete sentences; a segmented sentence generating unit (not shown), configured for segmenting the question language materials to generate a plurality of segmented sentences; a score determining unit (not shown), configured for determining a score of a segmented sentence according to a number of words contained in the segmented sentence and a number of words contained in a complete sentence corresponding to the segmented sentence, wherein the score is used for representing the probability of the segmented sentence corresponding to the score being a complete sentence; a probability determining unit (not shown), configured for determining the probability corresponding to the Chinese language model of the segmented sentence and the probability corresponding to the recurrent neural network language model; and a segmented sentence recognition model training unit (not shown), configured for training to obtain the segmented sentence recognition model by taking the probabilities of each of the segmented sentences and the scores of the segmented sentences as training samples.

In some optional implementations of the present embodiment, the segmented sentence generating unit (not shown) is specifically configured for generating the segmented sentences of each of the question language materials, and the generating the segmented sentences includes: segmenting a first question language material to obtain a first question language material composed of n words, wherein the first question language material is any question language material in the question corpus, and n is a natural number; taking the 1st to the $i^{th}$ words from the first question language material to generate an $i^{th}$ sentence, wherein $1 \leq i \leq n$; generating n segmented sentences corresponding to the first question language material; and on the basis of the generating the segmented sentences, generating segmented sentences corresponding to the first question language materials in the question corpus.

In some optional implementations of the present embodiment, the apparatus 500 further includes a segmented sentence determining module (not shown) which is configured for determining the current sentence to be a segmented sentence if the first probability is less than or equal to a pre-set first threshold, and generating prompt information for prompting the user to continue inputting.

It should be appreciated that by those skilled in the art that the segmented sentence recognition apparatus 500 for the human-machine intelligent question-answer system further includes some other well-known structures, such as a processor, a memory, etc., and these well-known structures are not shown in FIG. 5 in order to unnecessarily obscure the embodiments of the present disclosure.

Figure 6:
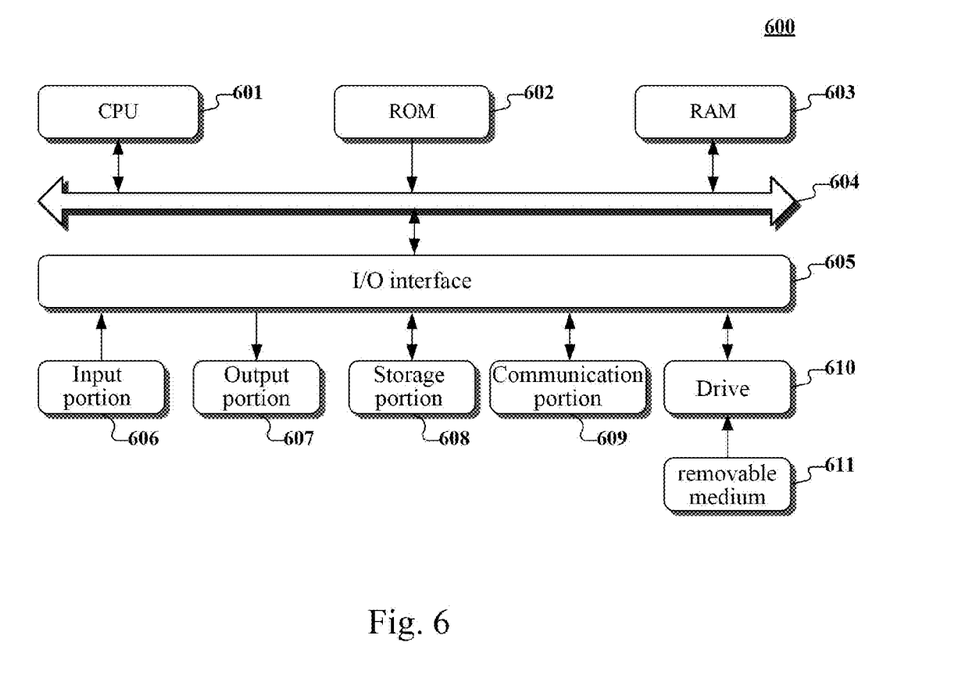
FIG. 6 is a structure diagram of a computer system of a terminal device or server suitable for implementing the embodiments of the present disclosure.

Referring to FIG. 6, a schematic structural diagram of a computer system 600 adapted to implement a terminal device or a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a current sentence receiving module, a first probability obtaining module and a complete sentence determining module, where the names of these units or modules do not in some cases constitute a limitation to such units or modules themselves. For example, the current sentence receiving module may also be described as "a module for receiving a current sentence input by a user."

In another aspect, the present disclosure further provides a non-volatile computer storage medium. The non-volatile computer storage medium may be the non-volatile computer storage medium included in the apparatus in the above described embodiments, or a stand-alone non-volatile computer storage medium not assembled into the apparatus. The non-volatile computer storage medium stores one or more programs. The one or more programs, when executed by a device, cause the device to: receiving a current sentence input by a user; inputting the current sentence into a pre-trained segmented sentence recognition model to obtain a first probability of the current sentence being a complete sentence, wherein the segmented sentence recognition model is used for determining the first probability according to a probability corresponding to a Chinese language model of the current sentence and a probability corresponding to a recurrent neural network language model; and determining the current sentence to be a complete sentence if the first probability is greater than a pre-set first threshold.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A segmented sentence recognition method for a human-machine intelligent question-answer system, the method comprising:
    receiving a current sentence input by a user;
    inputting the current sentence into a pre-trained segmented sentence recognition model to obtain a first probability of the current sentence being a complete sentence, wherein the segmented sentence recognition model is used for determining the first probability according to a probability corresponding to a Chinese language model of the current sentence and a probability corresponding to a recurrent neural network language model; and
    determining the current sentence to be a complete sentence if the first probability is greater than a pre-set first threshold.

2. The method according to claim 1, the method further comprising:
    determining, on the basis of the recurrent neural network language model, a second probability of a first word of the current sentence appearing in a previous sentence adjacent to the current sentence;
    determining the current sentence and the previous sentence adjacent to the current sentence to be segmented sentences if the second probability is greater than a pre-set second threshold; and
    combining the current sentence with the previous sentence as a complete sentence.

3. The method according to claim 2, the method further comprising:
    establishing the segmented sentence recognition model, comprising:
    acquiring a question corpus, wherein the question corpus comprises a plurality of question language materials, and the question language materials are complete sentences;
    segmenting the question language materials to generate a plurality of segmented sentences;
    determining a score of a segmented sentence according to a number of words contained in the segmented sentence and a number of words contained in a complete sentence corresponding to the segmented sentence, wherein the score is used for representing a probability of the segmented sentence corresponding to the score being a complete sentence;
    determining a probability corresponding to a Chinese language model of the segmented sentence and a probability corresponding to the recurrent neural network language model; and
    training to obtain the segmented sentence recognition model by taking the probabilities of each of the segmented sentences and the scores of the segmented sentences as training samples.

4. The method according to claim 3, wherein the segmenting the question language materials to generate a plurality of segmented sentences comprises:
    generating the segmented sentences, comprising: segmenting a first question language material to obtain the first question language material composed of n words, wherein the first question language material is a question language material in the question corpus, and n is a natural number; taking the $1^{st}$ to the $i^{th}$ words from the first question language material to generate an $i^{th}$ sentence, wherein $1 \leq i \leq n$; generating n segmented sentences corresponding to the first question language material; and
    generating, on the basis of the generating the segmented sentences, segmented sentences corresponding to the first question language materials in the question corpus.

5. The method according to claim 1, the method further comprising:
    determining the current sentence to be a segmented sentence if the first probability is less than or equal to the pre-set first threshold; and
    generating prompt information for prompting the user to continue inputting.

6. A segmented sentence recognition apparatus for a human-machine intelligent question-answer system, the apparatus comprising:
    at least one processor; and
    a memory storing instructions, the instructions when executed by the at least one processor, cause the at least one processor to perform operations, the operations comprising:
    receiving a current sentence input by a user;
    inputting the current sentence into a pre-trained segmented sentence recognition model to obtain a first probability of the current sentence being a complete sentence, wherein the segmented sentence recognition model is used for determining the first probability according to a probability corresponding to a Chinese language model of the current sentence and a probability corresponding to a recurrent neural network language model; and
    determining the current sentence to be a complete sentence if the first probability is greater than a pre-set first threshold.

7. The apparatus according to claim 6, wherein the operations further comprises:
    determining, on the basis of the recurrent neural network language model, a second probability of a first word of the current sentence appearing in a previous sentence adjacent to the current sentence;

determining the current sentence and the previous sentence adjacent to the current sentence to be segmented sentences if the second probability is greater than a pre-set second threshold; and combining the current sentence with the previous sentence as a complete sentence.

8. The apparatus according to claim 7, wherein the operations further comprises:

establishing the segmented sentence recognition model, and comprising:

acquiring a question corpus, wherein the question corpus comprises a plurality of question language materials, and the question language materials are complete sentences;

segmenting the question language materials to generate a plurality of segmented sentences;

determining a score of a segmented sentence according to a number of words contained in the segmented sentence and a number of words contained in a complete sentence corresponding to the segmented sentence, wherein the score is used for representing a probability of the segmented sentence corresponding to the score being a complete sentence;

determining a probability corresponding to a Chinese language model of the segmented sentence and a probability corresponding to the recurrent neural network language model; and training to obtain the segmented sentence recognition model by taking the probabilities of each of the segmented sentences and the scores of the segmented sentences as training samples.

9. The apparatus according to claim 8, wherein the segmenting the question language materials to generate a plurality of segmented sentences comprises:

generating the segmented sentences, the generating the segmented sentences comprises: segmenting a first question language material to obtain the first question language material composed of n words, wherein the first question language material is a question language material in the question corpus, and n is a natural number; taking the $1^{st}$ to the $i^{th}$ words from the first question language material to generate an $i^{th}$ sentence, wherein $1 \leq i \leq n$; generating n segmented sentences corresponding to the first question language material; and generating, on the basis of the generating the segmented sentences, segmented sentences corresponding to the first question language materials in the question corpus.

10. The apparatus according to claim 6, wherein the operations further comprises:

determining the current sentence to be a segmented sentence if the first probability is less than or equal to the pre-set first threshold; and generating prompt information for prompting the user to continue inputting.

11. A non-transitory computer storage medium, wherein the computer storage medium stores a computer readable instruction that can be executed by a processor, and when the computer readable instruction is executed by the processor, the processor executes the method according to claim 1.

* * * * *